(12) United States Patent
Arisi et al.

(10) Patent No.: US 11,486,257 B2
(45) Date of Patent: Nov. 1, 2022

(54) COOLING PASSAGE CONFIGURATION

(71) Applicant: Raytheon Technologies Corporation, Farmington, CT (US)

(72) Inventors: Allan N. Arisi, Manchester, CT (US); Dominic J. Mongillo, West Hartford, CT (US); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 224 days.

(21) Appl. No.: 16/856,558

(22) Filed: Apr. 23, 2020

(65) Prior Publication Data

US 2022/0042417 A1 Feb. 10, 2022

Related U.S. Application Data

(60) Provisional application No. 62/842,599, filed on May 3, 2019.

(51) Int. Cl.
*F01D 5/18* (2006.01)
(52) U.S. Cl.
CPC .......... *F01D 5/187* (2013.01); *F05D 2250/37* (2013.01); *F05D 2260/202* (2013.01); *F05D 2260/204* (2013.01); *F05D 2260/232* (2013.01)
(58) Field of Classification Search
CPC ............... F01D 5/187; F05D 2260/204; F05D 2260/232
See application file for complete search history.

(56) References Cited

U.S. PATENT DOCUMENTS

| | | | |
|---|---|---|---|
| 6,254,334 B1 * | 7/2001 | LaFleur | F01D 25/12 415/115 |
| 6,514,042 B2 | 2/2003 | Kvasnak et al. | |

(Continued)

OTHER PUBLICATIONS

International Search Report and Written Opinion for International Application No. PCT/US20/31355 dated Jan. 15, 2021.

(Continued)

*Primary Examiner* — Eldon T Brockman
(74) *Attorney, Agent, or Firm* — Carlson, Gaskey & Olds, P.C.

(57) ABSTRACT

A gas turbine engine article includes an article wall that has an inner portion at least partially defining a cavity and an outer portion. A plurality of first cooling passage networks each define first dimensions and are embedded in the article wall between the inner portion and the outer portion of the article wall. A plurality of second cooling passage networks each define second dimensions and are embedded into the article wall between the inner portion and the outer portions of the article wall. The plurality of first and second cooling passage networks are arranged in one of a first column of radially positioned networks and a second column of radially positioned networks. At least one cooling hole in the first column of radially positioned networks is located upstream of and radially aligned with at least one second mid-span wall between adjacent networks in the second column of networks.

20 Claims, 3 Drawing Sheets

(56) References Cited

U.S. PATENT DOCUMENTS

| | | | |
|---|---|---|---|
| 7,255,534 B2 * | 8/2007 | Liang | F01D 5/14 |
| | | | 415/115 |
| 7,293,961 B2 | 11/2007 | Lee et al. | |
| 7,556,476 B1 | 7/2009 | Liang | |
| 7,600,966 B2 * | 10/2009 | Devore | F01D 5/186 |
| | | | 415/115 |
| 9,995,145 B2 | 6/2018 | Propheter-Hinckley et al. | |
| 10,808,571 B2 * | 10/2020 | Propheter-Hinckley | |
| | | | F01D 25/12 |
| 10,968,752 B2 * | 4/2021 | Auxier | F01D 5/187 |
| 2007/0166161 A1 * | 7/2007 | Devore | F01D 5/186 |
| | | | 416/97 R |
| 2018/0371941 A1 * | 12/2018 | Propheter-Hinckley | |
| | | | F01D 5/08 |
| 2019/0055845 A1 | 2/2019 | Quach et al. | |
| 2019/0383147 A1 * | 12/2019 | Auxier | F01D 5/187 |

OTHER PUBLICATIONS

International Preliminary Report on Patentability for International Application No. PCT/US20/31355 dated Nov. 18, 2021.

* cited by examiner

COOLING PASSAGE CONFIGURATION

CROSS-REFERENCE TO RELATED APPLICATIONS

This disclosure is a continuation of U.S. Patent Application No. 62/842,599 filed May 3, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

In one exemplary embodiment, a gas turbine engine article includes an article wall that has an inner portion at least partially defining a cavity and an outer portion. A plurality of first cooling passage networks each define first dimensions and are embedded in the article wall between the inner portion and the outer portion of the article wall. A plurality of second cooling passage networks each define second dimensions and are embedded into the article wall between the inner portion and the outer portions of the article wall. The plurality of first and second cooling passage networks are arranged in one of a first column of radially positioned networks and a second column of radially positioned networks. At least one cooling hole in the first column of radially positioned networks is located upstream of and radially aligned with at least one second mid-span wall between adjacent networks in the second column of networks.

In a further embodiment of any of the above, the first column of radially positioned networks is an upstream most column of networks in the article. The second column of radially positioned networks is an aft most column of networks in the article.

In a further embodiment of any of the above, at least one cooling hole is located downstream of a leading edge of the article wall and at least partially axially aligned with a first mid-span wall located radially between networks in the first column of radially positioned networks.

In a further embodiment of any of the above, the first column of radially positioned networks includes only the first cooling passage networks. The second column of radially positioned networks includes only the second cooling passage networks.

In a further embodiment of any of the above, the first column of radially positioned networks and the second column of radially positioned networks each include at least one of the first cooling passage networks and at least one of the second cooling passage networks.

In a further embodiment of any of the above, at least one second cooling passage network in the first column of radially positioned networks in a non-overlapping radial orientation relative to the at least one second cooling passage network in the second column of radially positioned networks.

In a further embodiment of any of the above, the plurality of first cooling passage networks each have at least one inlet orifice through the inner portion of the article outer wall to receive cooling air from the cavity, a plurality of sub-passages that extend axially from the at least one inlet orifice, and at least one outlet orifice through the outer portion of the article wall.

In a further embodiment of any of the above, the plurality of second cooling passage networks each have at least one inlet orifice through the inner portion of the article outer wall to receive cooling air from the cavity, a plurality of sub-passages that extend axially from the at least one inlet orifice, and at least one outlet orifice through the outer portion of the article wall.

In a further embodiment of any of the above, the first column of radially positioned networks include at least one first mid-span wall located between adjacent networks and radially offset from the at least one second mid-span wall and radially aligned with at least one outlet orifice in the second column of radially positioned networks.

In a further embodiment of any of the above, the article includes an airfoil section with the at least one first mid-span wall and the at least one second mid-span wall free of cooling passages.

In a further embodiment of any of the above, the first dimensions include a radial dimension that is less than a radial dimension of the second dimensions.

In another exemplary embodiment, a gas turbine engine includes a compressor section. A combustor is in fluid communication with the compressor section. A turbine section is in fluid communication with the combustor. The turbine section has a turbine engine article that includes an article wall that has an inner portion at least partially defining a cavity and an outer portion. A plurality of first cooling passage networks each define first dimensions and are embedded in the article wall between the inner portion and the outer portion of the article wall. A plurality of second cooling passage networks each define second dimensions and are embedded into the article wall between the inner portion and the outer portions of the article wall. The plurality of first and second cooling passage networks are arranged in one of a first column of radially positioned networks and a second column of radially positioned networks. At least one cooling hole in the first column of radially positioned networks is located upstream of and radially aligned with at least one second mid-span wall between adjacent networks in the second column of networks.

In a further embodiment of any of the above, the first column of radially positioned networks is an upstream most column of networks in the article and the second column of radially positioned networks is an aft most column of networks in the article. The first dimensions include a radial dimension that is less than a radial dimension of the second dimensions.

In a further embodiment of any of the above, the at least one cooling hole is located downstream of a leading edge of the article wall and at least partially axially aligned with at least one first mid-span wall in the first column of radially positioned networks.

In a further embodiment of any of the above, the at least one second mid-span wall is radially offset from the at least one first mid-span wall.

In a further embodiment of any of the above, the first column of radially positioned networks includes only the plurality of first cooling passage networks. The second column of networks includes only the plurality of second cooling passage networks.

In a further embodiment of any of the above, the first column of radially positioned networks and the second column of radially positioned networks each include at least one of the plurality of first cooling passage networks and at least one of the plurality of second cooling passage networks.

In a further embodiment of any of the above, the at least one second cooling passage network in the first column is radially positioned in a non-overlapping radial orientation relative to the at least one second cooling passage network in the second column.

In a further embodiment of any of the above, the plurality of first cooling passage networks each have at least one inlet orifice through the inner portion of the article outer wall to receive cooling air from the cavity, a plurality of sub-passages that extend axially from the at least one inlet orifice, and at least one outlet orifice through the outer portion of the article wall.

In a further embodiment of any of the above, the plurality of second cooling passage networks each have at least one inlet orifice through the inner portion of the article outer wall to receive cooling air from the cavity, a plurality of sub-passages that extend axially from the at least one inlet orifice, and at least one outlet orifice through the outer portion of the article wall.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
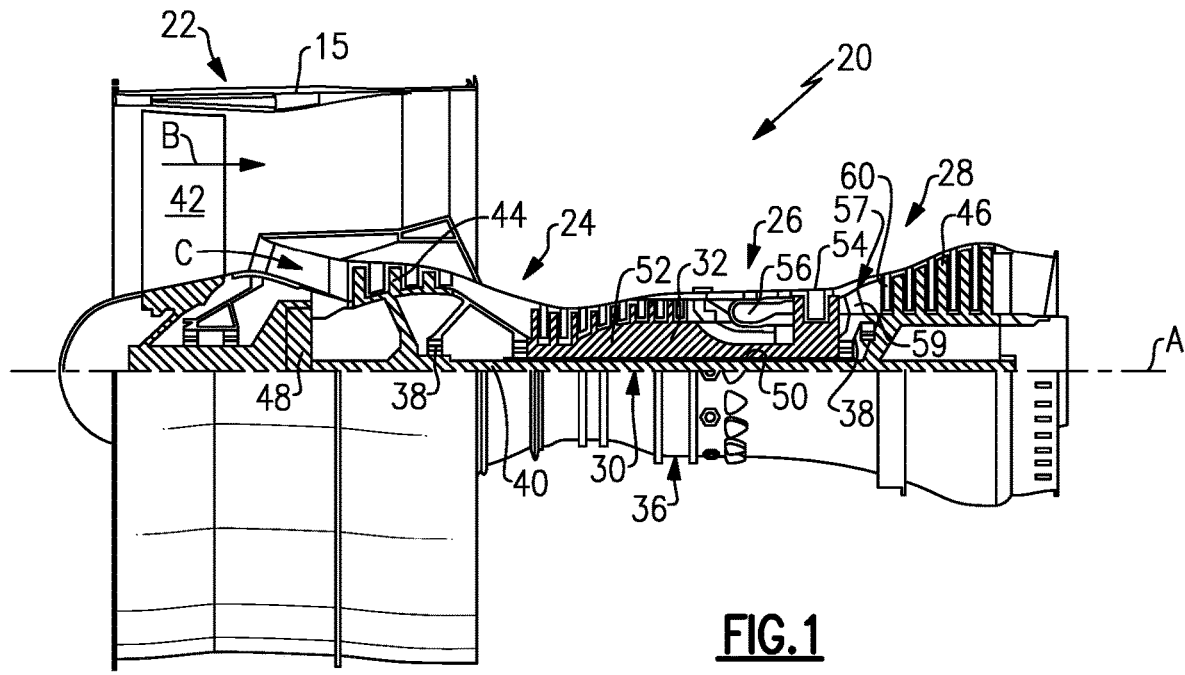
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]^0.5. The "Low corrected fan tip speed" as disclosed herein according to one non-limiting embodiment is less than about 1150 ft/second (350.5 meters/second).

Figure 2:
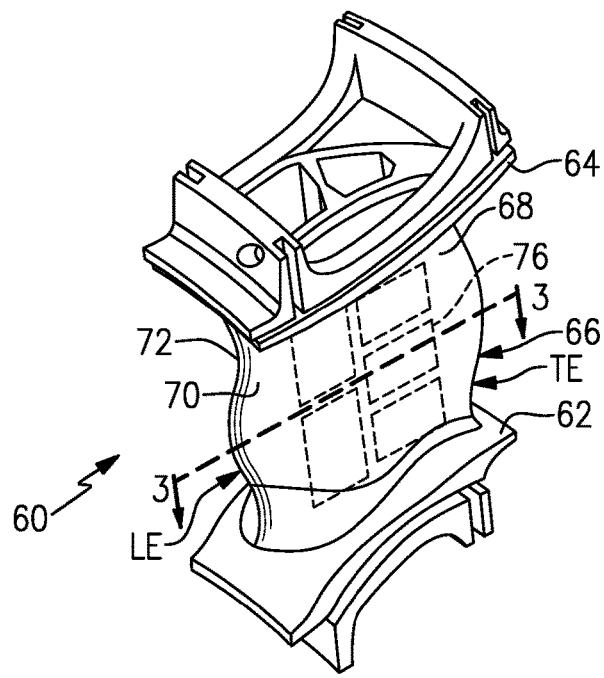
FIG. 2 illustrates an airfoil of the engine of FIG. 1.

FIG. 2 illustrates a representative example of a gas turbine engine article, namely a turbine airfoil 60 used in the turbine engine 20 (see also FIG. 1). As shown, the turbine airfoil 60 is a turbine vane; however, it is to be understood that, although the examples herein may be described with reference to the turbine vane, this disclosure is also applicable to turbine blades, blade outer air seals, and combustor panels. The turbine airfoil 60 is also shown in a cross-sectioned view in FIG. 3.

Figure 3:
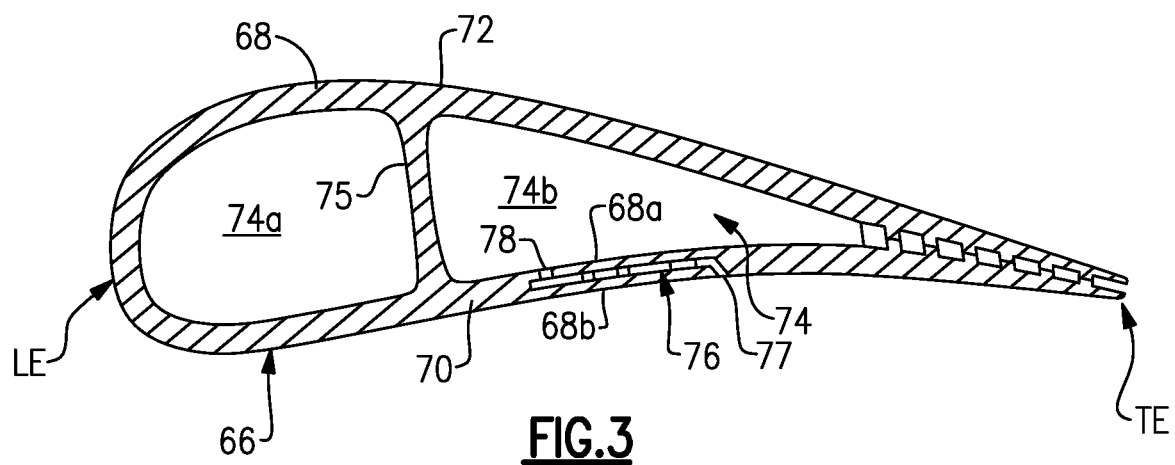
FIG. 3 illustrates a sectioned view of the airfoil of FIG. 3.

Referring to FIGS. 2 and 3, the turbine airfoil 60 includes an inner platform 62, an outer platform 64, and an airfoil section 66 that spans between the inner and outer platforms 62/64. The airfoil section 66 includes an airfoil outer wall 68 that delineates the profile of the airfoil section 66. The outer wall 68 defines a leading end (LE), a trailing end (TE), and first and second sides 70/72 that join the leading and trailing ends. In this example, the first side 70 is a pressure side and the second side 72 is a suction side. The outer wall 68 circumscribes an internal core cavity 74, which in this example is partitioned by a rib 75 into a forward core cavity 74a and an aft core cavity 74b. As will be appreciated, there may alternatively be only a single core cavity or there may be additional ribs to partition additional core cavities.

There is at least one cooling passage flow circuit network 76 embedded in the airfoil outer wall 68 between inner and outer portions 68a/68b of the airfoil wall 68. For example, as shown (FIG. 3) one or more of the cooling passage networks 76 is embedded in the first side 70 of the outer wall 68, although one or more cooling passage flow circuit networks 76 could additionally or alternatively be embedded in the first side 70. The cooling passage flow circuit networks 76 may also be referred to as minicores, minicore passages, micro-cores, and/or micro channels. A "minicore", "minicore passage", "micro-core", and "micro-channels" are all terms used to describe and/or reference an inter-wall convective and/or convective and film cooled cooling passage or circuit that comprises of various inlet feed geometries, internal convective heat transfer augmentation features, and exit discharge features in order to produce high film cooling capability.

As stated a "minicore" is typically an "inter-wall" or "embedded" cooling passage or circuit, that may be fabricated using a variety of manufacturing techniques, including, but not limited to, ceramic silica or alumina cores bodies, fabricated from core dies and used in conjunction with a wax pattern, as part of the "lost wax" investment casting process. Alternatively, minicores may also be fabricated from RMC (Refractory Metal Core) material which provides added core stiffness and robustness for producibility purposes. Advanced manufacturing techniques may also be used to fabricate ceramic "minicore" geometries, such as those used in additive manufacturing laser powder bed processes, which are then integrated into a wax pattern, as part of the "lost wax" investment casting process. In yet another alternate embodiment the "minicore" geometries may be fabricated directly out of metal using a DMLS (Direct Metal Laser Sintering) additive manufacturing laser powder bed metal process. As such, the minicores are integrated to provide highly effective "inter-wall" thermal cooling effectiveness, and therefore the relative size of the minicore internal convective cooling geometries and passages are significantly smaller in comparison to those employed in a main body core that is used to form a main or central core cavity in an airfoil.

Figure 4:
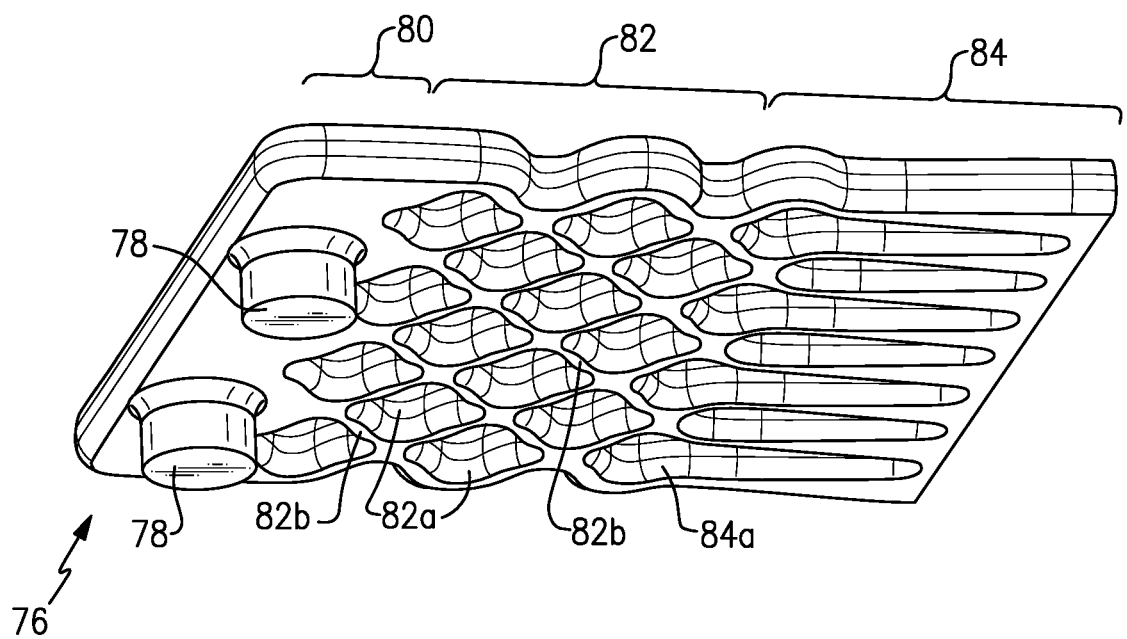
FIG. 4 illustrates an "inverse" or negative view of a cooling passage network of the airfoil of FIG. 3.

FIG. 4 shows an "inverse" or negative view of a representative one of the cooling passages flowing circuit networks 76. The inverse view is also representative of an investment core that may be used in an investment casting process to form the network 76 in the airfoil 60. Most typically, the investment casting core is injection molded from a material that contains ceramic or metal alloy. The investment core is shaped to form the cooling passage flow circuit network 76. In the inverse view, solid structures of the investment core produce void structures in the cooling passage flow circuit network 76 and void structures of the investment core produce solid structures in the cooling passage flow circuit network 76. Thus, the investment core has the negative of the structural and internal convective heat transfer features of the cooling passage flow circuit network 76. It is to be understood that although the inverse views presented herein may be used to describe features of the network 76, each negative view also represents an investment core and a corresponding cavity in a molding tool and/or core die that is operable to molding and fabricating the investment core.

The cooling passage flow circuit network 76 includes at least one inlet orifice 78 through the inner portion 68a of the airfoil outer wall 68 (FIG. 3) to receive cooling air from the internal core cavity 74. The inlet orifice 78 may be, but is not limited to, round, rectangular, oval (racetrack) and may be sized appropriately to achieve desired flow and fill characteristics in the cooling passage flow circuit network 76. Most typically, the cooling passage flow circuit network 76 will include 2 inlet orifices 78. A single, exclusive inlet orifice 78 is also contemplated, as well as more than 2 inlet orifices 78, although fabrication may be challenging. The size, location, and arrangement of the inlet apertures may vary depending on air flow and thermal cooling effectiveness requirements necessary to meet local metal temperature and durability life objectives.

The inlet orifices 78 open into a radially-elongated manifold region 80, which serves to distribute the cooling air to a downstream sub-passage region 82. Stated differently, the inlet flow apertures are arranged laterally within the minicore cooling circuit in order to optimize internal backside impingement and convective cooling flow characteristics, and mitigate local cooling flow recirculation zones and/or eliminate regions of internal flow separation which exhibit poor convective cooling characteristics. One of the inlet orifices 78 is located in the radially upper half of the manifold region 80 and the other of the inlet orifices 78 is in the radially lower half of the manifold region 80. Most typically, the radially upper and lower halves of the network 76 are mirror images, i.e., symmetric relative to the midline of the network between the two inlet orifices 78.

In this example, the region 82 includes an array of pedestals 82a that defines a plurality of sub-passages 82b there between. For instance, the pedestals 82a are provided in radially-aligned rows and may include up to 10 rows that are staggered relative to each other, although in the illustrated example there are 4 rows. The pedestals 82a as shown have a lobed-diamond cross-sectional geometry in which each of the faces of the diamond are concave such that the tips of the diamond form rounded projections, i.e., a lobes. It is to be understood, however, that the pedestals 82a may alternatively be, but are not limited to, diamond or other polygonal shape, round, oval, or elliptical. The size of the pedestals 82a and sub-passages 82b may be determined based on achieving the desired cooling air flow, pressure loss, and convective heat transfer characteristics required across the minicore flow circuit network 76.

It should be recognized by those skilled in the art that the axial or streamwise length of the minicore circuit network 76 and the number of pedestal rows and blockage requirements are also a strong function of the available pressure ratio across the minicore cooling passage flow circuit network 76. The available pressure ratio is defined as the ratio of the supply pressure feeding the inlet orifices 78, divided by the downstream minicore circuit slot exit region 84 static pressure sink or discharge pressure. The sink or discharge pressure is a function of the local airfoil surface Mach number, temperature, pressure gradient, and velocity, all of which are dictated by the aerodynamic shape and the amount of turning of the freestream air induced by the airfoil geometry.

The management of pressure ratio and the pressure losses within the minicore cooling passage flow circuit network is essential to achieving optimal thermal performance and convective efficiency. Therefore evaluating the pressure losses across each of the elements comprising the minicore cooling passage flow circuit must be evaluated. There are typically 3 main elements or regions within each of the minicore cooling passage flow circuits 76, the inlet orifices or supply feeds 78 (region 80), the internal heat transfer cooling features i.e.—trip strips, pedestals, pin fins, divots, hemispherical protrusions, etc, (region 82), and the downstream plurality of exit flow features (region 84).

The manifold region 80 and region 82 may also include additional heat transfer augmentation features such as dimples, trip-strips, pedestals, pin fins, hemispherical protrusions, etc. depending on the desired pressure losses, cooling air temperature heat pickup, as well as, local convective heat transfer and thermal cooling requirements necessary to achieve the desired local metal temperature and film cooling effectiveness requirements immediately adjacent to and downstream of the minicore flow circuit. In addition, the radial (or lateral) and axial (or streamwise) spacing of these internal features may also vary to achieve the desired cooling flow rate, pressure loss, cooling air temperature heat pickup, internal Reynolds number, and corresponding convective heat transfer, and heat conduction required to achieve the optimal local thermal cooling effectiveness. The tailoring of internal pressure loss and convective heat transfer within the minicore cooling circuit network 76 is contingent on the local external heat flux distribution.

The sub-passages 82b are circuitous but extend generally axially from the manifold region 80 and inlet orifices 78 to a downstream exit region 84. In this example, the exit region 84 includes a plurality of flow guides 84a. For instance, the flow guides 84a have a teardrop shape and facilitate the lateral distribution, straightening and guiding cooling air flow into one or more outlet orifices 77 (FIGS. 3 and 5-7) through the outer portion 68b (FIGS. 3 and 5-7) of the airfoil wall 68. The axial extent of the regions 80/82/84 may be varied based on desired heat transfer, pressure loss, overall size (i.e. height or lateral distance in the radial direction, and width in the streamwise axial flow direction) of the minicore cooling passage flow circuit network 76, and manufacturability.

Figure 5:
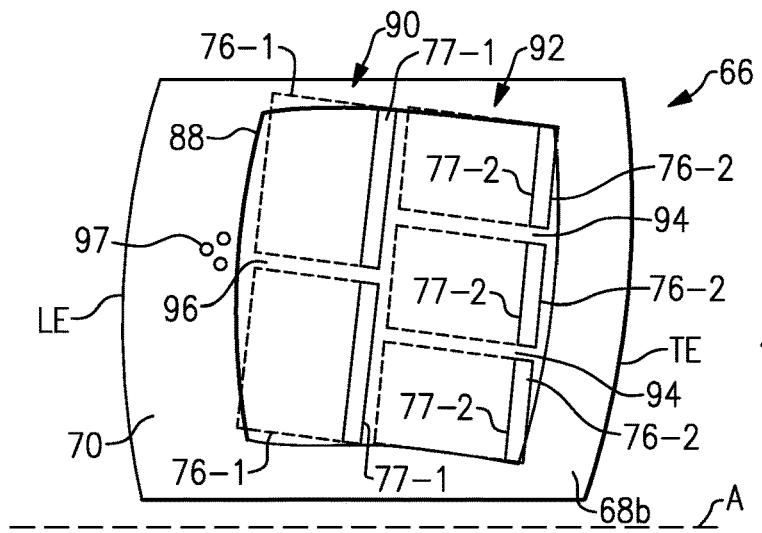
FIG. 5 illustrates an example configuration of cooling passage networks.

FIG. 5 shows an example configuration of an arrangement of minicore cooling passages flow circuit networks 76 on the first side 70 of the airfoil 66 with a mid-span portion surface 88 that comprises a total surface area that may range between 80%-100% of the surface area on the first side 70 of the airfoil section 66 and is spaced inward from the LE, TE, and opposing radial edges of the airfoil section 66. The mid-span portion includes an area of the first side 70 of the airfoil section 66 experiencing the highest external heat flux and gas temperatures and must have adequate coverage of the minicore cooling passage flow circuit networks 76 to ensure optimal distribution of interface and post spall metal temperatures along the first side 70 of the airfoil 66 in order to meet durability oxidation and thermal mechanical fatigue life requirements. Ideally, it is desired to maximize the coverage of the airfoil surface portion 88 with the minicore footprint in order to ensure the required or optimal distribution inter-wall internal convective and film cooling provided by the cooling air through each of the minicore cooling passage flow circuit networks 76. However, due to minicore manufacturing and producibility concerns associated with core breakage, core assembly, and wall control the overall physical geometric size (i.e. height or lateral distance in the radial direction, and width in the streamwise axial flow direction) of the minicore cooling passage flow circuit network 76 has to be considered in the overall design and size of each of the minicore cooling passage flow circuit networks 76 on the first side 70 within the airfoil 66, the inner diameter platform 62, and the outer diameter platform 64 endwall geometry surfaces. In addition to casting and core manufacturing producibility concerns there are also both local and bulk thermal airfoil cooling design factors and requirements that need to be considered and evaluated to ensure the optimal number and distribution of minicore cooling passage flow circuit networks 76 are being utilized.

In the current embodiment described herein, multiple minicores are needed to properly cover the entire airfoil surface and provide optimal cooling. In particular, as the minicore cooling passage flow circuit networks 76, become increasingly larger, they are subject to potential producibility and yield issues associated with core breakage during the injection, core firer, and core assembly processes. Conversely as the minicore cooling passage flow circuit networks 76 become smaller, the surface area that each of the minicore cooling passage flow circuit networks 76 protects or "covers" may be considerably reduced. The significant reduction in the "covered" surface area due to the smaller minicore cooling passage flow circuit networks 76 footprint size, will result in a significant reduction in the relative percentage that the total mid span portion surface 88 will be covered for an equivalent number of minicore cooling passage flow networks 76. Therefore a greater number of the smaller minicore cooling passage flow circuit networks 76 would be required to maintain the same relative coverage of the total mid span portion surface 88. The increased number of smaller minicore cooling passage flow circuit networks 76 will increase producibility costs from a core manufacturing and assembly perspective, as well as, increase the overall cooling airflow flow requirements, which negate the intent of implementing the minicore cooling passage flow circuit networks 76 concepts described within this embodiment. By limiting the number of unique minicores, the producibility costs are reduced.

To maintain optimal cooling, the minicore cooling passage flow circuit networks 76 are generally 0.020 inches (0.508 mm) thick which limits the networks 76 radially to between 0.130 inches (3.302 mm) and 0.650 inches (16.510 mm) and axially between 0.250 inches (6.350 mm) and 0.650 inches (16.510 mm). Additionally, it is also desirable to minimize the number of unique minicores used to effectively cool the airfoil surface 70 in order to minimize cost associated with manufacturing minicores for the turbine article such as airfoil.

In the illustrated example shown in FIG. 5, the first column 90 of minicore cooling networks 76 includes two minicore cooling passage flow circuit networks 76-1 with each having the same radial and axial dimensions, and the second column 92 of minicore cooling networks 76 includes three minicore cooling passage flow circuit networks 76-2 with each having the same radial and axial dimensions. In this sense there are only two sizes of minicore networks 76-1 and 76-2 that are utilized to cool the first side 70. The networks 76-1 include outlet orifices 77-1 that are radially aligned with mid-span walls 94 located between adjacent minicore networks 76-2 in the second column 92 to provide cooling to the first side 70 of the airfoil section 66 between the minicore networks 76-2. The minicore networks 76-2 also include outlet orifices 77-2. It is important to recognize that within this embodiment that both minicore cooling passage flow networks, 76-1 and 76-1 each span across a nearly equivalent radial distance that is defined by the mid-span portion surface 88, of the first side 70, of the airfoil section 66.

Additionally, a mid-span wall 96 is located between the networks 76-1 and is not cooled by the networks 76-1 or 76-2 but is still within the mid-span portion 88 of the airfoil section 66. To cool the mid-span wall 96, cooling holes 97 are located upstream and radially aligned with the mid-span wall 96. The cooling holes 97 provide cooling for the mid-span wall 96 because the airfoil section 66 is sized such that it cannot accommodate an additional column of networks 76 upstream of the minicore cooling passage flow circuit networks 76-1 that could provide cooling to the mid-span wall 96. The cooling holes 97 are also located downstream of the leading edge LE. The cooling holes 97 are in fluid communication with the forward core cavity 74a. The networks 76-1 can also be in fluid communication with the forward core cavity 74a and the networks 76-2 can be in fluid communication with the aft core cavity 74b.

Figure 6:
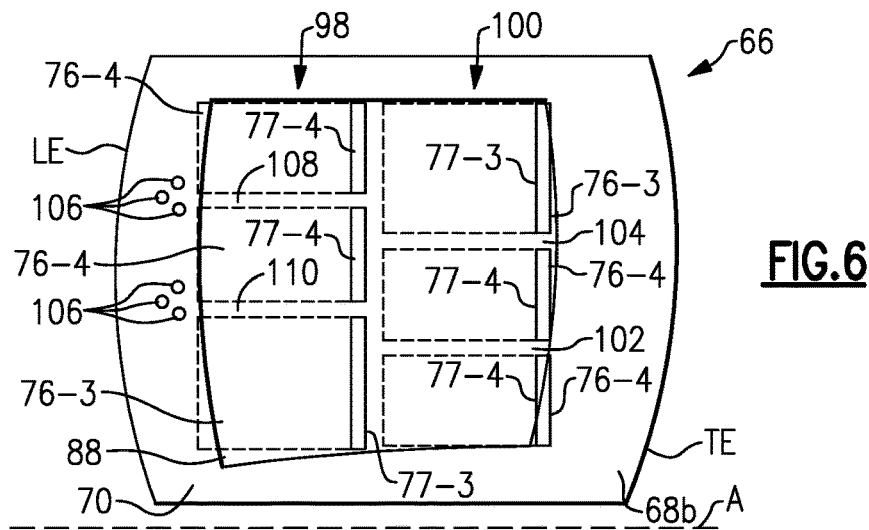
FIG. 6 illustrates another example configuration of cooling passage networks.
Figure 7:
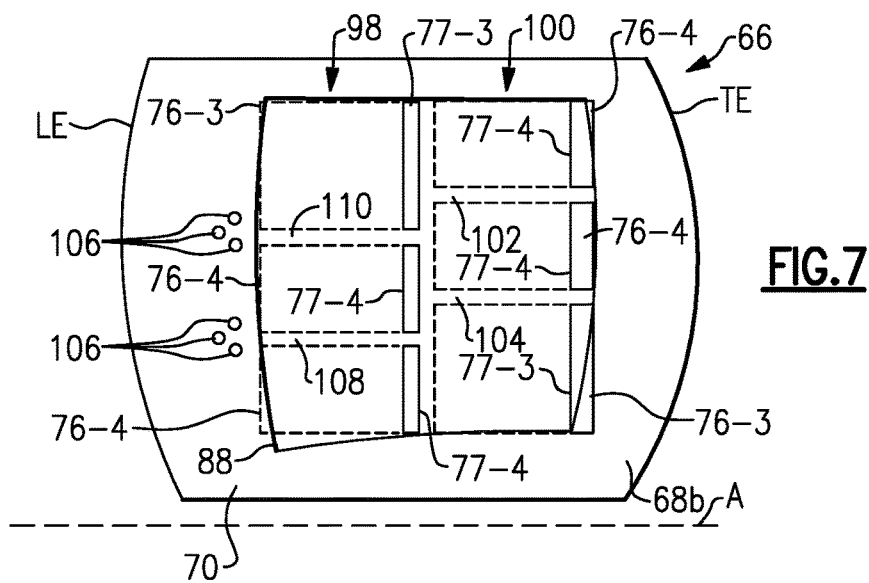
FIG. 7 illustrates yet another example configuration of cooling passage networks.

FIG. 6 illustrates another example configuration of minicore cooling passage flow circuit networks 76 on the first side 70 of the airfoil section 66 located within the mid-span portion 88. The configuration of minicore cooling passage flow circuit networks 76 includes a first column 98 having a single minicore cooling network 76-3 and a pair of minicore cooling networks 76-4 and a second column 100 includes one single minicore cooling network 76-3 and another pair of minicore cooling networks 76-4. FIG. 7 illustrates yet another example configuration of minicore cooling passage flow circuit networks 76 that is similar to the configuration in FIG. 6 but with the order of individual networks in the first and second columns 98, 100 reversed.

The minicore cooling network 76-3 includes an outlet orifice 77-3 that is radially aligned with a mid-span wall 102 located between the pair of minicore cooling networks 76-4 in the second column 100. And a middle one of the pair of minicore cooling networks 76-4 include outlet orifices 77-4 with at least one of the outlet orifices 77-4 that is radially aligned with a mid-span wall 104 located between the minicore cooling network 76-3 in the network 76-4 in the second column 100.

Cooling holes 106 are located upstream and radially aligned with a mid-span wall 108 located between the pair of networks 76-4 in the first column 98 and a mid-span wall 110 located between the network 76-3 and one of the pair of networks 76-4 in the first column 98. This allows for the mid-span walls 108 and 110 in the mid-span portion 88 of the airfoil section 66 to receive sufficient cooling. The cooling holes 106 are located in fluid communication with the forward core cavity 74a. The cooling holes 106 are also located downstream of the leading edge LE.

By having a minimum of three minicores in the second column 92, it enables the distance between the outlet orifices 77 to the airfoil trailing edge TE to be minimized in order to mitigate local airfoil trailing edge oxidation. By reducing the distance between the outlet orifices 77 and the airfoil trailing edge TE, the level of film cooling effectiveness will remain relatively high, providing a better insulating boundary of film cooling air to reduce the local trailing edge heat flux and local operating metal temperatures for improved part durability capability.

Additionally, by having a minimum of three minicores in the second column 92, it enables local tailoring of the cooling flow from any one of the three minicore cooling networks 76-1-76-4. In this sense, the radial distribution of cooling flow from any of the three minicore cooling networks can be increased and or decreased through modifications of the supply feeds. The optimization and tailoring of cooling flow distribution in any of the three minicore cooling networks enables increased robustness of the cooling design in that the cooling flows can be tailored to better align with changes in radial temperature profile and heat flux distributions. Since there are three minicore networks in the second column 92, the cooling flow increase to one of the three minicore circuits will be reduced relative to a second column 92 comprising of only two minicore circuits covering the same radial extent of mid span portion surface 88. In this sense local durability life shortfalls can be addressed with lower levels of cooling flow that are more isolated and targeted. The reduced level of cooling flow required to address local durability life shortfalls minimizes the adverse impacts associated with aerodynamic cooling flow mixing losses and the impact to both stage and turbine efficiency.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
   an article wall having an inner portion at least partially defining a cavity and an outer portion;
   a plurality of first cooling passage networks each define first dimensions and are embedded in the article wall between the inner portion and the outer portion of the article wall;
   a plurality of second cooling passage networks each define second dimensions and are embedded into the article wall between the inner portion and the outer portions of the article wall, wherein the plurality of first and second cooling passage networks are arranged in one of a first column of radially positioned networks and a second column of radially positioned networks; and
   at least one cooling hole located upstream of the first column of radially positioned networks and radially aligned with at least one first mid-span wall between adjacent networks in the first column of radially positioned networks.

2. The article of claim 1, wherein the first column of radially positioned networks is an upstream most column of networks in the article and the second column of radially positioned networks is an aft most column of networks in the article.

3. The article of claim 1, wherein the at least one cooling hole is located downstream of a leading edge of the article wall.

4. The article of claim 3, wherein the first column of radially positioned networks includes only the plurality of first cooling passage networks and the second column of radially positioned networks includes only the plurality of second cooling passage networks.

5. The article of claim 3, wherein the first column of radially positioned networks and the second column of radially positioned networks each include at least one of the plurality of first cooling passage networks and at least one of the plurality of second cooling passage networks.

6. The article of claim 5, wherein the at least one of the plurality second cooling passage networks in the first column of radially positioned networks is in a non-overlapping radial orientation relative to the at least one of the plurality of second cooling passage networks in the second column of radially positioned networks.

7. The article of claim 3, wherein the plurality of first cooling passage networks each have at least one inlet orifice through the inner portion of the article wall to receive cooling air from the cavity, a plurality of sub-passages that extend axially from the at least one inlet orifice, and at least one outlet orifice through the outer portion of the article wall.

8. The article of claim 7, wherein the plurality of second cooling passage networks each have at least one inlet orifice through the inner portion of the article wall to receive cooling air from the cavity, a plurality of sub-passages that extend axially from the at least one inlet orifice, and at least one outlet orifice through the outer portion of the article wall.

9. The article of claim 3, wherein the second column of radially positioned networks include at least one second mid-span wall located between adjacent networks and radially offset from the at least one first mid-span wall and the at least one second mid-span wall is radially aligned with at least one outlet orifice in the first column of radially positioned networks.

10. The article of claim 9, wherein the article includes an airfoil section with the at least one first mid-span wall and the at least one second mid-span wall free of cooling passages with the at least one first mid-span wall fluidly isolating adjacent cooling passages networks in the plurality of first cooling passage networks and the at least one second mid-span wall fluidly isolating adjacent cooling passage networks in the plurality of second cooling passage networks.

11. The article of claim 3, wherein the first dimensions include a first radial dimension extending between a radially inner perimeter and a radially outer perimeter of one of the plurality of first cooling passage networks, the second dimensions include a second radial dimension extending between a radially inner perimeter and a radially outer perimeter of one of the plurality of second cooling passage networks, and the first radial dimension is less than the second radial dimension.

12. A gas turbine engine comprising:
    a compressor section;
    a combustor in fluid communication with the compressor section; and
    a turbine section in fluid communication with the combustor, the turbine section having a turbine engine article that includes:
       an article wall having an inner portion at least partially defining a cavity and an outer portion;
       a plurality of first cooling passage networks each define first dimensions and are embedded in the article wall between the inner portion and the outer portion of the article wall;
       a plurality of second cooling passage networks each define second dimensions and are embedded into the article wall between the inner portion and the outer portions of the article wall, wherein the plurality of first and second cooling passage networks are arranged in one of a first column of radially positioned networks and a second column of radially positioned networks; and
       at least one cooling hole located upstream of the first column of radially positioned networks and radially aligned with at least one first mid-span wall between adjacent networks in the first column of radially positioned networks.

13. The gas turbine engine of claim 12, wherein the first column of radially positioned networks is an upstream most column of networks in the article and the second column of radially positioned networks is an aft most column of networks in the article and the first dimensions include a first radial dimension extending between a radially inner perimeter and a radially outer perimeter of one of the plurality of first cooling passage networks, the second dimensions include a second radial dimension extending between a radially inner perimeter and a radially outer perimeter of one of the plurality of second cooling passage networks, and the first radial dimension is less than the second radial dimension.

14. The gas turbine engine of claim 12, wherein the at least one cooling hole is located downstream of a leading edge of the article wall.

15. The gas turbine engine of claim 14, wherein the second column of radially positioned networks include at least one second mid-span wall located between adjacent networks and the at least one second mid-span wall is radially offset from the at least one first mid-span wall and the first dimensions include a first radial dimension extending between a radially inner perimeter and a radially outer perimeter of one of the plurality of first cooling passage networks, the second dimensions include a second radial dimension extending between a radially inner perimeter and a radially outer perimeter of one of the plurality of second cooling passage networks, and the first radial dimension is less than the second radial dimension.

16. The gas turbine engine of claim 14, wherein the first column of radially positioned networks includes only the plurality of first cooling passage networks and the second column of networks includes only the plurality of second cooling passage networks.

17. The gas turbine engine of claim 14, wherein the first column of radially positioned networks and the second column of radially positioned networks each include at least one of the plurality of first cooling passage networks and at least one of the plurality of second cooling passage networks.

18. The gas turbine engine of claim 17, wherein the at least one of the plurality of second cooling passage networks in the first column is radially positioned in a non-overlapping radial orientation relative to the at least one of the plurality of second cooling passage networks in the second column.

19. The gas turbine engine of claim 14, wherein the plurality of first cooling passage networks each have at least one inlet orifice through the inner portion of the article outer wall to receive cooling air from the cavity, a plurality of sub-passages that extend axially from the at least one inlet orifice, and at least one outlet orifice through the outer portion of the article wall.

20. The gas turbine engine of claim 19, wherein the plurality of second cooling passage networks each have at least one inlet orifice through the inner portion of the article outer wall to receive cooling air from the cavity, a plurality of sub-passages that extend axially from the at least one inlet orifice, and at least one outlet orifice through the outer portion of the article wall.

* * * * *